Dec. 5, 1933.　　　　G. S. MANN　　　　1,938,035
ADJUSTABLE PIPE COUPLING
Filed Dec. 23, 1931
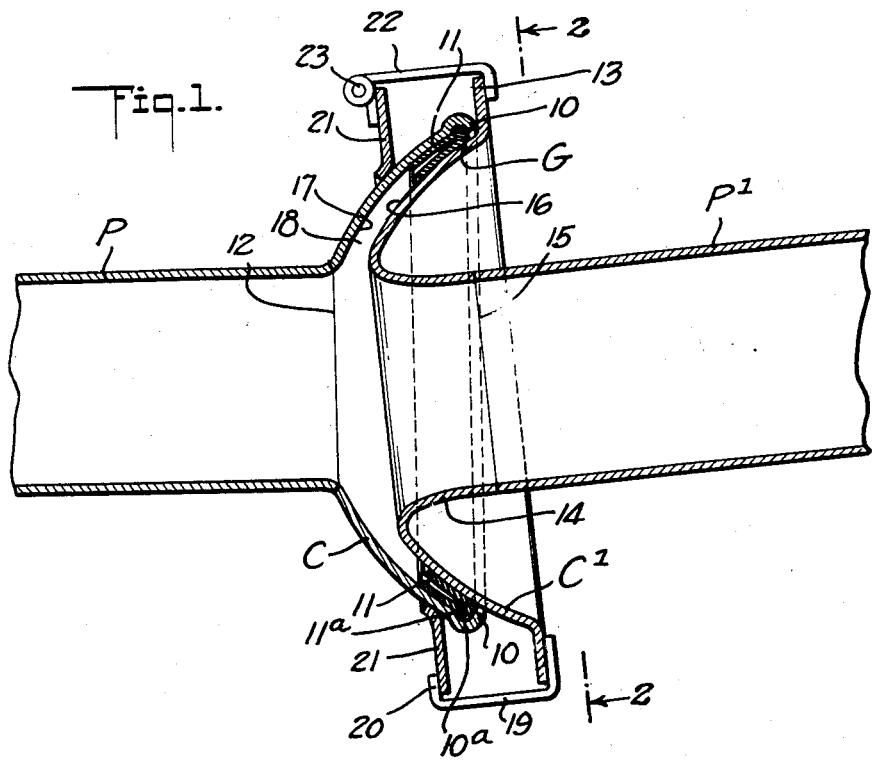
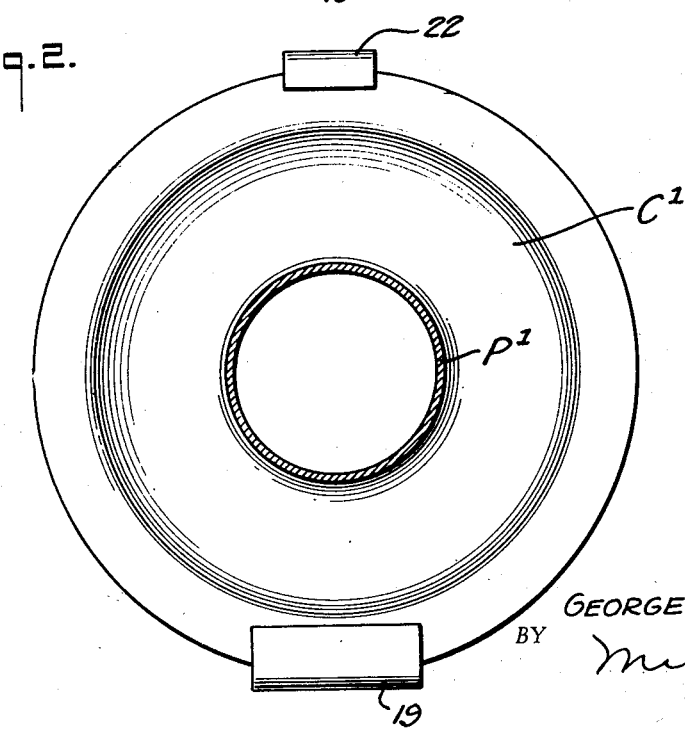
INVENTOR.
GEORGE S. MANN
BY
ATTORNEYS.

Patented Dec. 5, 1933

1,938,035

UNITED STATES PATENT OFFICE 1,938,035

ADJUSTABLE PIPE COUPLING

George S. Mann, Los Angeles, Calif.

Application December 23, 1931
Serial No. 582,824

2 Claims. (Cl. 285—91)

This invention relates to and has for a purpose the provision of a coupling structurally characterized in a manner to enable pipe sections to be readily coupled together in various angular relationships, and effectively sealed against leakage of fluid under high pressure within the piping, to the end of permitting the laying of piping on surfaces of uneven contour.

It is a further purpose of this invention to provide an angularly adjustable coupling, the parts of which are of extremely simple and inexpensive construction and capable of being coupled with the utmost ease and dispatch in a manner to confine a gasket between co-acting coupling elements for deformation under the action of internal fluid pressure so as to hermetically seal the joint between the coupling elements, all while insuring the gasket against displacement by the fluid pressure, and limiting angular adjustment of the elements to a predetermined maximum, beyond which an effective seal could not be obtained.

Only one form of this invention will be described, and the novel features thereof pointed out in claims.

In the accompanying drawing,

Figure 1 is a view showing in central section one form of adjustable coupling embodying this invention, connecting two pipe sections in angular relationship;

Figure 2 is a transverse sectional view taken on the line 2—2 of Figure 1.

Referring specifically to the drawing, in which similar reference characters designate similar parts in each of the several views, this invention in its present embodiment comprises two annular coupling elements C and $C^1$ of concavo-convex cross section preferably less than 90° in extent, with the coupling element C constructed at its outer peripheral edge to provide an annular retaining lip 10 and an annular retaining groove 10$a$.

A flexible gasket G of annular form and split to provide a slot 11 opening to one side edge of the gasket is seated against the concave inner surface of the coupling element C to abut the retaining lip 10; and the gasket is further provided with an annular bead 11$a$ seating in the groove 10$a$ to prevent inward displacement of the gasket when the coupling elements are being assembled.

The inner peripheral edge of the coupling element C is adapted to be welded along the line 12 to a pipe section P so as to secure the element to the pipe section.

From the outer peripheral edge of the coupling $C^1$ projects outwardly a fixed flange 13; and from its inner peripheral edge projects axially a collar 14 to which a second pipe section $P^1$ is adapted to be welded along the line 15 so as to secure this element to the pipe section.

With the coupling elements C and $C^1$ secured to the confronting ends of the pipe sections P and $P^1$, and the element $C^1$ extended into the element C so that the outer convex surface 16 of the former confronts the inner concave surface 17 of the latter, the gasket G will be interposed between the elements and will space the elements apart to provide an annular space 18 preferably decreasing slightly in width radially outward of the elements. As the annular space 18 exposes the gasket to internal fluid pressure within the coupled pipe sections, the fluid is free to enter the slot 11 of the gasket and deform or expand the gasket to seal the joint between the elements; the retaining lip 10 functioning to prevent displacement of the gasket under the fluid pressure.

In order to secure the coupling elements together, a lug 19 is welded to the flange 13 of the element $C^1$ to project laterally from the flange. The free end of the lug 19 is provided with an inwardly projecting lip 20 against which is adapted to abut a loose ring 21, the internal diameter of which is less than the external diameter of the coupling element C so that the ring will engage the outer convex surface of this coupling element. One or two of these lugs can be provided at spaced locations circumferentially; and in conjunction with the lug, a holding member, in the present instance in the form of a hook 22, is pivoted at 23 on the ring 21 and is adapted to have hooked engagement with the flange 13 for co-action with the lug in snugly connecting the coupling elements in various positions of angular relationship, against separation axially.

It will be manifest that the convex and concave surfaces 16 and 17 of the respective coupling elements C and $C^1$ enable the elements to be relatively adjusted angularly for connection in various positions of angular relationship so as to permit piping to be laid on surfaces of uneven contour; and it will be noted that the flange 13 co-acts with the retaining lip 10 in limiting angular adjustment of the elements to a predetermined maximum beyond which gasket G would be out of effective sealing contact with the convex surface 17 of the element $C^1$.

It has been found in practice that, with the coupling elements snugly connected as above described, internal fluid pressure entering the slot 11 of the gasket G will expand the latter with sufficient force against the surfaces 16 and 17 of the elements, to hermetically seal the joint between the elements.

Furthermore, the coupling as structurally characterized can be assembled and disassembled with the utmost ease and dispatch, and the elements and ring 21 can be readily pressed from sheet metal of suitable gage into the shapes described, as no reverse bends are present in the structure to require more expensive methods of construction.

What is claimed is:

1. An adjustable coupling comprising an annular coupling element of concavo-convex cross section less than 90° in extent; a second annular coupling element of concavo-convex cross section less than 90° in extent, disposed with its convex surface confronting the concave surface of the first said element; a gasket interposed between said convex and concave surfaces of the element to provide an annular space between the elements exposing the gasket to internal fluid pressure for deformation thereby to seal the joint between the elements; said first coupling element adapted to be secured at its inner peripheral edge to a pipe section and being inturned at its outer peripheral edge to provide an annular retaining lip against which the gasket abuts to confine the gasket against displacement by fluid pressure; said second coupling element having an annular flange projecting from its outer peripheral edge and an axially extending collar projecting from its inner peripheral edge for securing said second coupling element to a second pipe section; a loose ring of less internal diameter than the external diameter of said first coupling element for engagement with the outer surface of the latter; and means co-acting with the flange and ring to secure the coupling elements together.

2. An adjustable coupling comprising two annular coupling elements of concavo-convex cross section disposed with the concave surface of one element confronting the convex surface of the other element; said one of the elements having an annular retaining lip projecting inwardly from its outer peripheral edge; said other of the elements having a flange projecting outwardly from its outer peripheral edge; a gasket interposed between said concave and convex surfaces of the elements; a loose ring of an internal diameter less than the external diameter of said one of the elements; a loose ring of an internal diameter surface of the latter; and means co-acting with the flange and ring to secure the coupling elements together.

GEORGE S. MANN.